United States Patent
Settimi

[15] 3,679,228
[45] July 25, 1972

[54] RESTRAINT APPARATUS

[72] Inventor: Raymond J. Settimi, 23350 Los Encinos Way, Woodland Hills, Calif. 91364

[22] Filed: Aug. 19, 1970

[21] Appl. No.: 64,993

Related U.S. Application Data

[62] Division of Ser. No. 740,970, June 28, 1968, Pat. No. 3,550,875.

[52] U.S. Cl....................280/150 SB, 242/107.4, 297/388
[51] Int. Cl..................................................B60r 21/10
[58] Field of Search.............280/150 SB; 180/82; 297/385, 297/388, 389; 242/107 SB, 107.3, 107.4, 107.6

[56] References Cited

UNITED STATES PATENTS

| | | | |
|---|---|---|---|
| 3,491,966 | 1/1970 | Curran et al. | 242/107.4 |
| 2,886,259 | 5/1959 | Barecki | 242/107.4 |
| 3,363,712 | 1/1968 | Fontaine | 297/388 X |
| 3,439,933 | 4/1969 | Jantzen | 280/150 SB |
| 3,459,440 | 8/1969 | Hopka et al. | 280/150 SB |
| 3,288,254 | 11/1966 | Replogle | 280/150 SB X |
| 3,412,952 | 11/1968 | Wohlert et al. | 242/107.4 |
| 3,526,431 | 9/1970 | Boedigheimer et al. | 297/388 |
| 3,528,702 | 9/1970 | Boedigheimer et al. | 297/388 |

*Primary Examiner*—Benjamin Hersh
*Assistant Examiner*—Leslie J. Paperner
*Attorney*—Miketta, Glenny, Poms and Smith

[57] ABSTRACT

A vehicle occupant restraint apparatus including a shoulder strap having a connector on the free end thereof adapted to be engaged with a floor-mounted connector so as to be positioned diagonally across the upper torso of an occupant, and being secured within a spring biased retraction device supported by an outer wall of the vehicle and a stowing clip also supported on the vehicle outer wall so that the shoulder strap may be stowed in an out-of-the-way position when not in use. There is also disclosed a spring biased retraction device in which a strap is wound around a reel and is put in position for use by protraction of the strap to the desired length and then allowing slight rewind or retraction of the strap whereupon the reel will be locked against further protraction or retraction.

2 Claims, 15 Drawing Figures

PATENTED JUL 25 1972 3,679,228

INVENTOR.
RAYMOND J. SETTIMI
By
Miketta, Glenny, Poms & Smith
ATTORNEYS.

INVENTOR.
RAYMOND J. SETTIMI
By
Miketta, Glenny, Poms & Smith
ATTORNEYS.

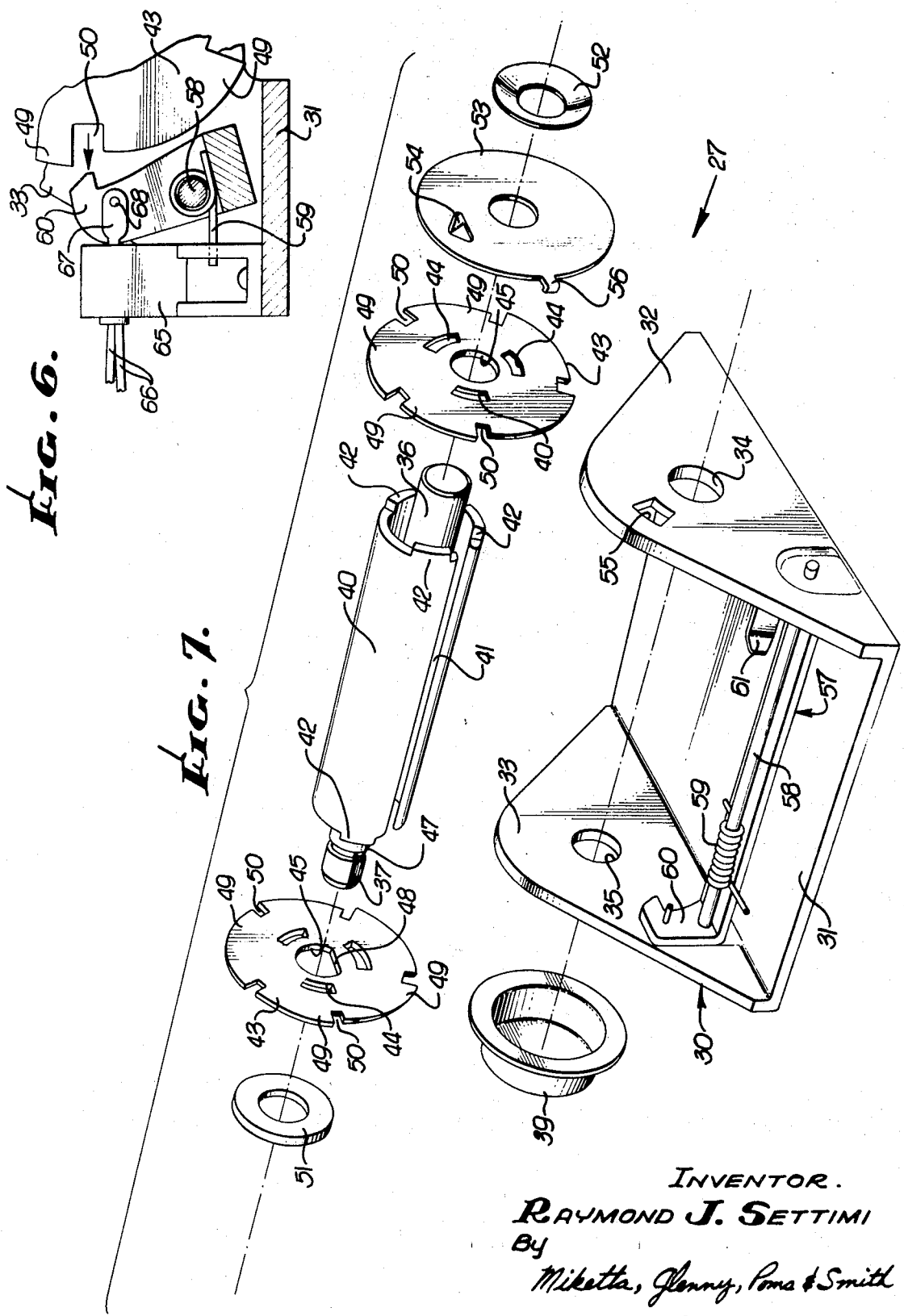

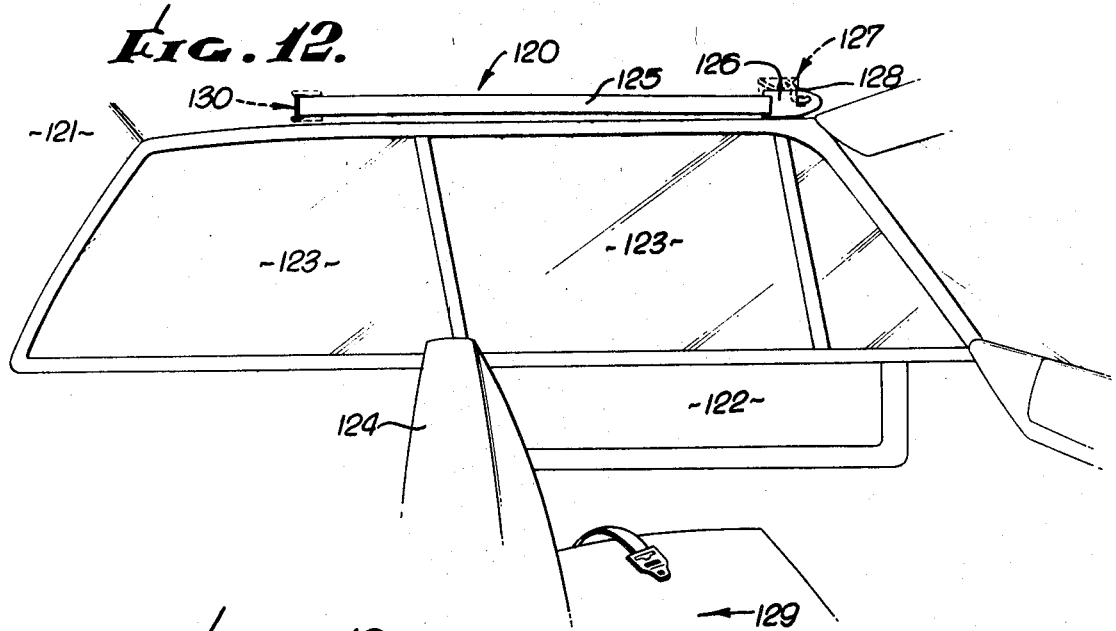
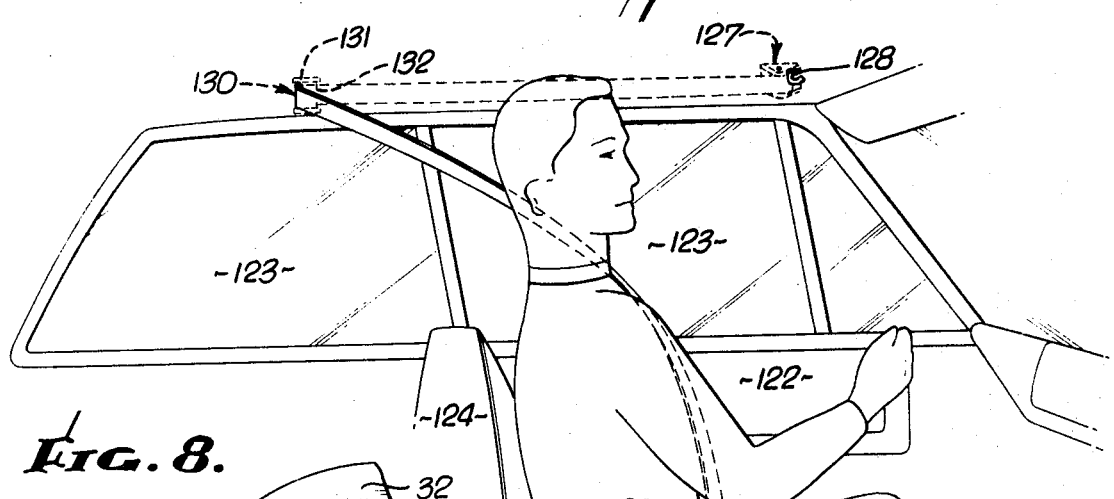
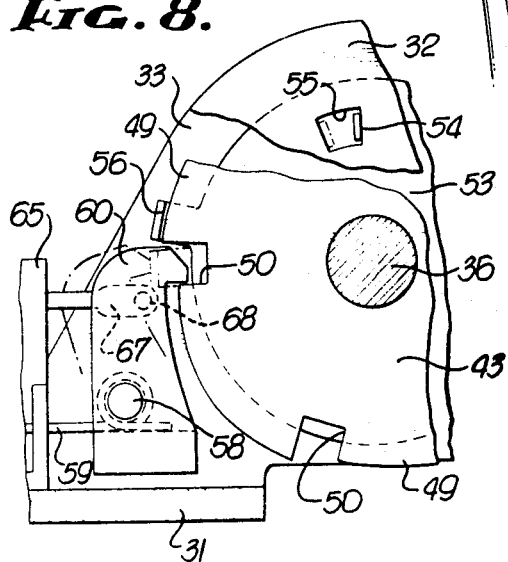

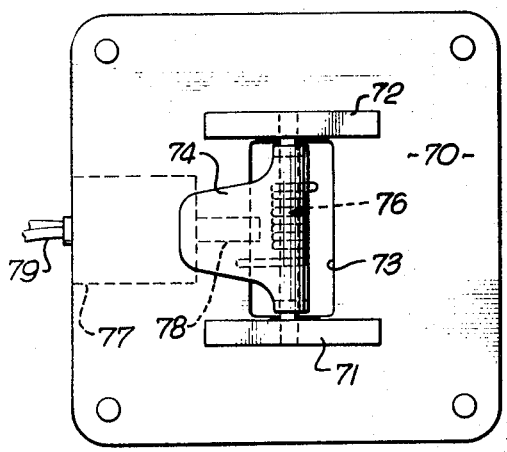
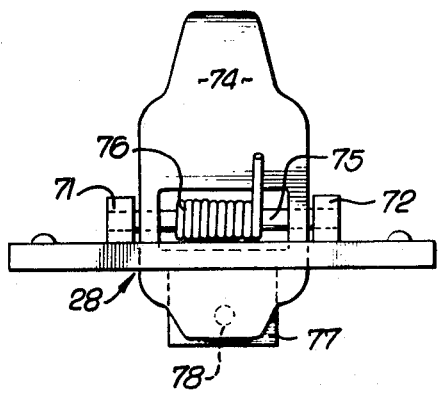
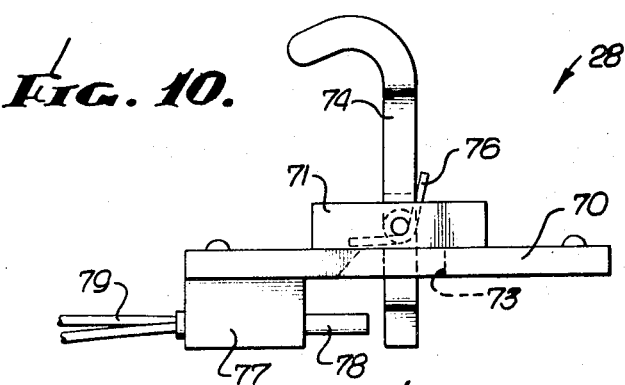
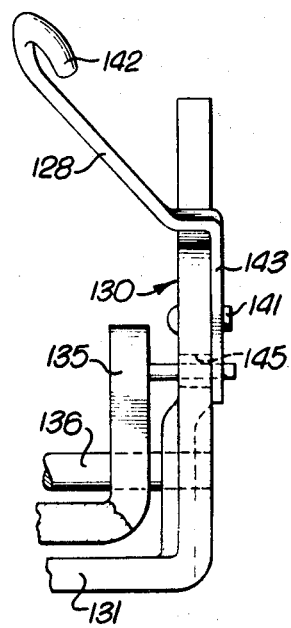
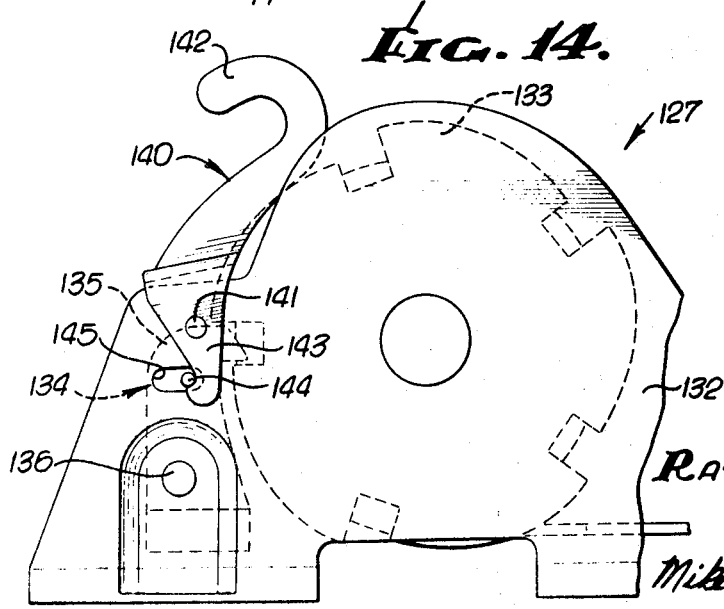
INVENTOR.
RAYMOND J. SETTIMI

RESTRAINT APPARATUS

This is a division of application Ser. No. 740,970, filed June 28, 1968, now U.S. Pat. No. 3,550,875.

Restraint apparatus in which one of the flexible restraining members, belts or straps is normally spring biased for retraction within a housing are well known in the prior art. In such devices, there is generally provided a spring biased reel within a housing around which a strap or belt having a latching or connector member on the free end thereof is wound. When not in use, the strap is biased to automatically retract within the housing so as to be in an out-of-the-way position. In this manner, one portion of the belt which restrains the occupant in a seat is normally retracted so as not to interfere with the ingress and egress of an occupant into a vehicle and more particularly into the vehicle seat. Moreover, such device renders one portion of the seat belt easily locatable by the occupant for convenient attachment to a cooperating connector or buckle, on another, floor-mounted seat belt or strap portion, or secured directly to an anchor on the vehicle floor.

Recently, a retractor device has been devised in which subsequent to the engagement of the two-strap portions through the latching members, further protection of the seat belt member which is retractable is prevented. While such devices of an inertia type have been known in the prior art for many years, the inertia type of devices have been complicated, expensive and therefore adapted only for a limited and particular use and application. A non-inertia type of retractable device in which protraction is prevented during use is shown in U.S. Pat. No. 3,174,704, issued Mar. 23, 1965. The device described and illustrated in U.S. Pat. No. 3,174,704 includes a strap retraction device comprising a frame in which is mounted a reel to which the strap is wound and secured for protraction and retraction, a spring for constantly biasing the reel for retraction of the strap within the retraction device, and means for preventing further protraction of the strap after the strap is initially protracted and then allowed to partially retract. Thus, in a vehicle safety restraint apparatus in which such retraction device is used, the strap is protracted from the retraction device to a length sufficient to connect the latching member on the strap to a complementary latching member on a second strap. When the connected biased strap is released, the strap is drawn tightly against the body of the occupant using the restraint apparatus.

Devices of the last-described type place a constant tension on the strap or belt during use and this tension may be uncomfortable to an occupant using the restraint apparatus. While the constant tension of the belt on the occupant is not particularly objectionable where the belt circumscribes the waist of the occupant, i.e., a lap belt, such tension is highly objectionable and disconcerting in a restraint apparatus in which one of the straps is positioned over the chest of the occupant, i.e., a shoulder strap. Where a shoulder strap is used, the occupant will withdraw the retractable portion of the shoulder strap from the housing and connect it to the cooperating portion of the other strap. Further protraction is then prevented. However, if the occupant moves backward, or "settles-back" in the seat, the tension is relieved on the shoulder strap and a portion of the strap is retracted within the housing. This results in a closer "fit" of the shoulder or chest strap which further restricts movement of the occupant. Such protraction prevention means will then be actuated so as to prevent further protraction of the reduced length shoulder strap so that the occupant is then precluded from moving forward from such settled back position. It will be readily apparent that such condition may be extremely uncomfortable to the occupant.

Another problem exists in the use of prior art retraction devices in a restraint apparatus in which a shoulder strap is constantly biased for retraction. In such type of restraint apparatus, the shoulder strap is of substantial length and thus a spring biasing means must be provided that has considerable strength so as to provide for full retraction of this extended length belt. This creates the not insubstantial danger that if the occupant releases the free end of the shoulder strap such end will be rapidly withdrawn into the housing and may strike the occupant in the facial area causing considerable discomfort if not physical injury. A large spring is also required undesirably increasing the overall dimensions of the retractor.

Accordingly, it is a general object of the present invention to provide a restraint apparatus in which a shoulder strap is effectively mounted at one end to the outer wall of a vehicle above and to the rear of the shoulder of the occupant to be restrained through a retraction device and which may be easily and conveniently stowed in an out-of-the-way position proximate the vehicle outer wall, without being entirely retracted within the retraction device housing.

It is another general object of the present invention to provide a retraction device in which a strap is biased for retraction about a reel rotatably mounted in a frame and which includes not only means for preventing further protraction of the strap but also means for preventing further retraction so that all tension is relieved from the belt after it is connected about the occupant to provide maximum comfort consistent with safety precautions.

An object of the present invention is to provide a restraint apparatus including a retraction device which provides spring biased retraction of a shoulder strap wound about a reel, and a stowing clip mounted on the vehicle outer wall so that the free end of the shoulder strap can be engaged by the stowing clip to maintain the shoulder strap in an out-of-the-way position when not in use.

Another object of the present invention is to provide a restraint apparatus of the above-described type in which the retraction device includes means for preventing both protraction and retraction of the strap after an initial protraction thereof so as to constitute a tensionless strap and in which the stowing clip is operative to override the retraction preventing means so that the biased reaction of the strap may be used to move the strap into an out-of-the-way position.

A further object of the present invention is to provide a restraint apparatus of the last-described type in which the retraction device is completely enclosed between the headliner and the outer wall of the vehicle so as to be hidden from view and to provide a pleasing aesthetic appearance.

Still another object of the present invention is to provide a restraint apparatus of the above-described type in which the stowing clip is conveniently located on the outer wall of the vehicle so that the fixed length shoulder strap after protraction to the desired length can be adjusted by the occupant to another length so as to accommodate desired movement during use.

Still one more object of the present invention is to provide a restraint apparatus of the above-described type for use in a vehicle in which there is provided means to engage the free end of the shoulder strap in an out-of-the-way position and retain such position in such position by tension and in which the strap can be easily and conveniently grasped by an occupant so as to prevent the requirement of extended retraction and reduce the possibility of injury to an occupant due to being struck by the free end of the strap during retraction.

Generally stated, the present invention comprises a safety restraint apparatus for use in a vehicle having an outer wall, including a floor-mounted latching member to which a complementary latching member on one end of a shoulder strap may be engaged so as to position the strap across the chest of a vehicle occupant, the other end of the strap being connected to retracting means which is effectively mounted on the vehicle outer wall rearwardly and above the shoulder of the occupant to be restrained and includes, a frame in which a reel is rotatably mounted and about which reel the strap is wound and secured for protraction and retraction, a spring member constantly biasing the reel for retraction of the strap, and stowing means mounted on the outer wall of the vehicle for engaging the latching member on the free end of the shoulder strap and maintaining the shoulder strap in an out-of-the-way position. The invention further contemplates the provision of a retraction device, as above described, which includes a provision for preventing further protraction and retraction of a strap wound about the reel after the strap is protracted and then allowed to partially retract.

Other objects as well as various advantages of the generally described restraint apparatus and retraction device of the present invention will be apparent to those skilled in the art from a consideration of the following detailed explanation of several exemplary embodiments of a restraint apparatus and one exemplary embodiment of a retraction device constructed in accordance with the present invention and by reference to the appended sheets of drawings.

In the drawings:

FIG. 6 is a fragmentary sectional view of a portion of the retractor device of FIG. 3;

FIG. 7 is an exploded perspective view of the retractor device of FIG. 3;

FIG. 8 is a fragmentary sectional view of a portion of the retractor device of FIG. 3 showing the strap retraction and protraction preventing means in several positions;

FIG. 9 is a top plan view of a stowing clip constructed in accordance with the present invention;

FIG. 10 is a side elevation view of the clip of FIG. 9;

FIG. 11 is a rear elevation view of the clip of FIG. 9;

FIG. 12 is an elevation view of a second exemplary embodiment of a restraining apparatus constructed in accordance with the present invention and installed in a conventional vehicle shown in the stowed condition;

FIG. 13 is an elevation view of the restraint apparatus of FIG. 12 shown in use by an occupant of the vehicle;

FIG. 14 is a side fragmentary sectional view of a retractor device and override means constructed in accordance with the present invention; and FIG. 15 is a fragmentary end elevation view of the device of FIG. 14.

Figure 1:
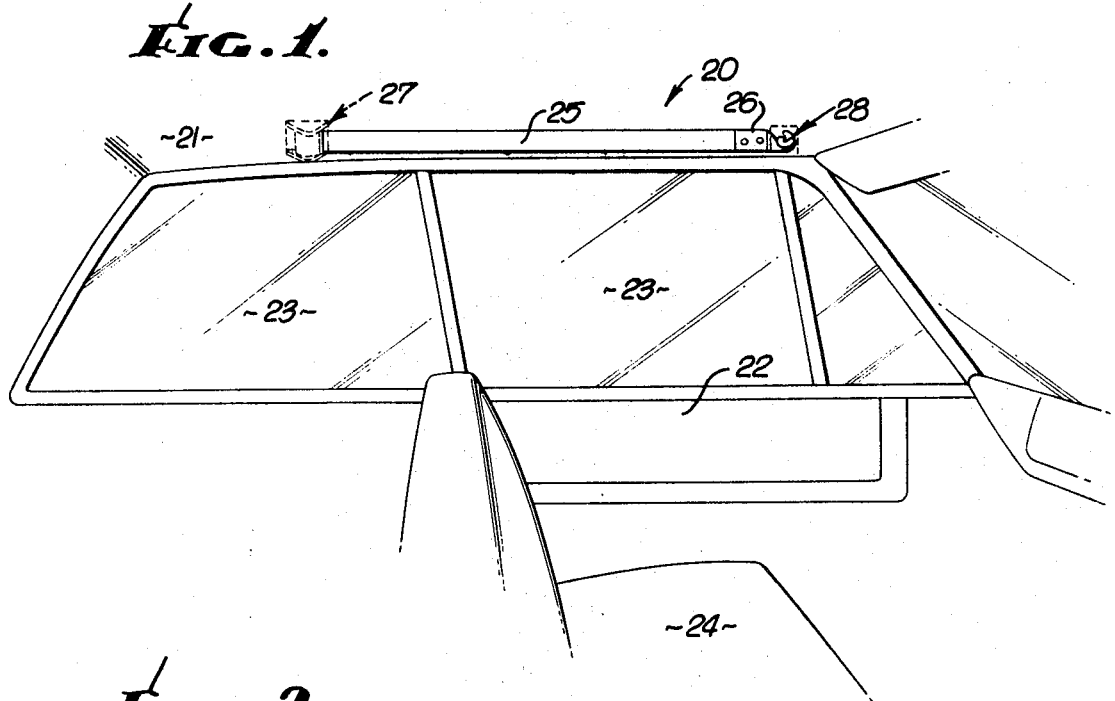
FIG. 1 is an elevation view of a first exemplary embodiment of a restraint apparatus constructed in accordance with the present invention installed in a conventional vehicle and shown in a stowed condition.
Figure 2:
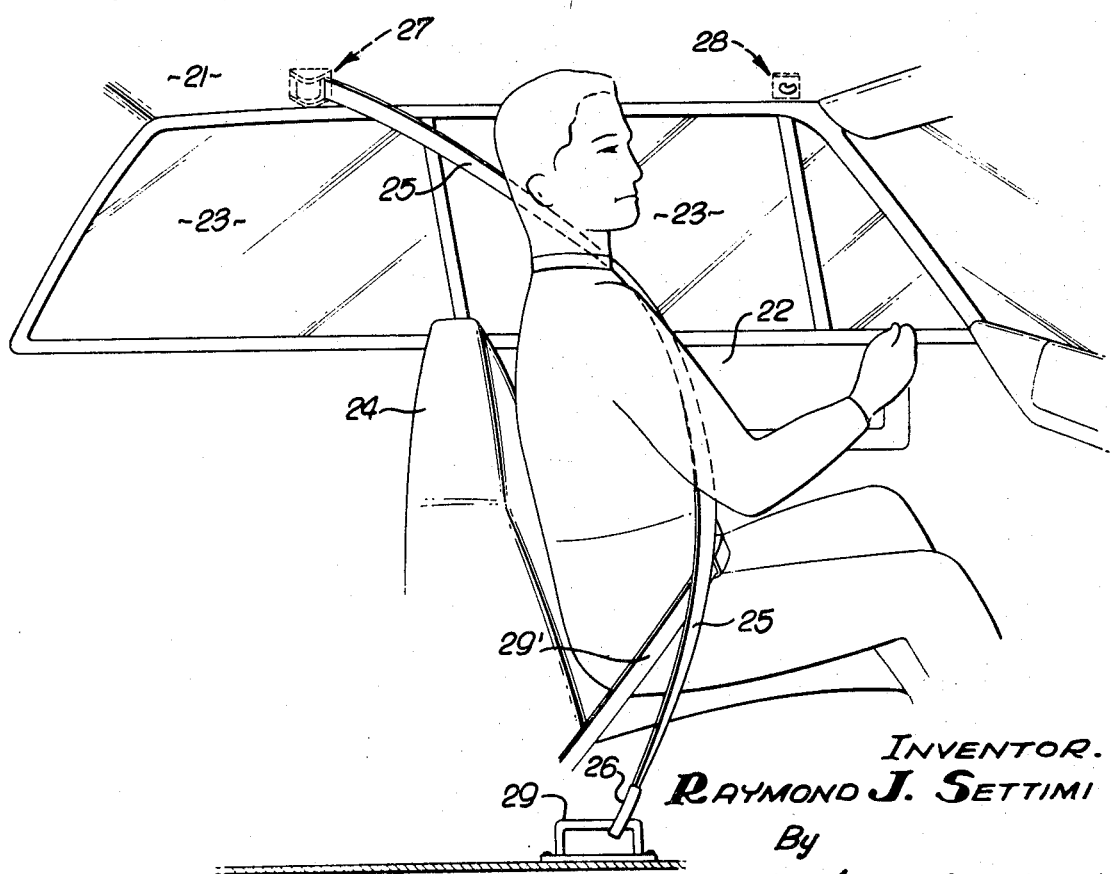
FIG. 2 is an elevational view of the restraint apparatus of FIG. 1 shown in use by an occupant of the vehicle.
Figure 3:
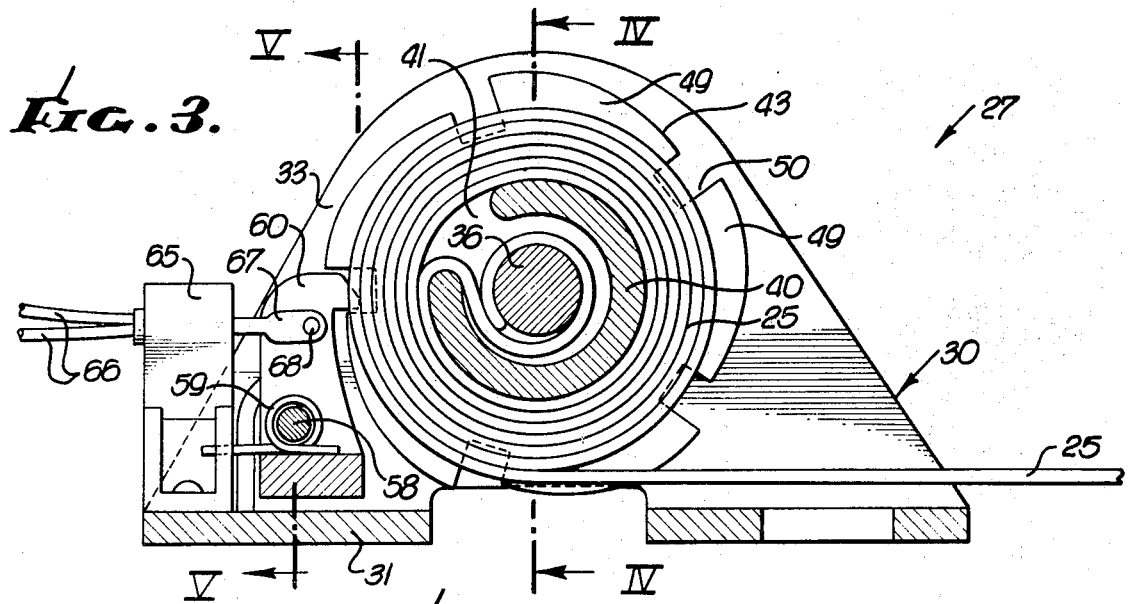
FIG. 3 is a side sectional view of an exemplary embodiment of a retractor device in accordance with the present invention.
Figure 4:
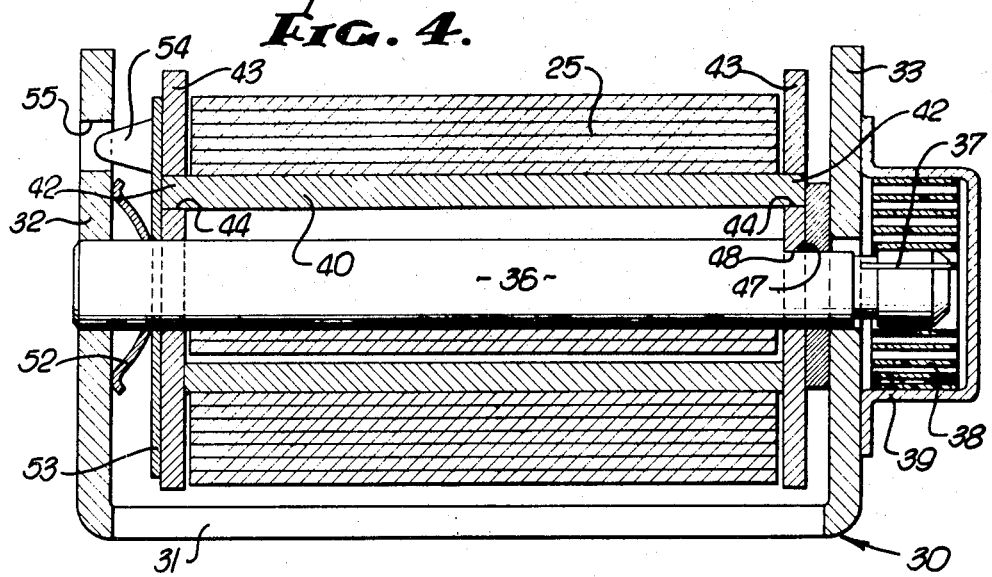
FIG. 4 is a sectional view of the retractor device taken along the plane IV—IV of FIG. 3.
Figure 5:
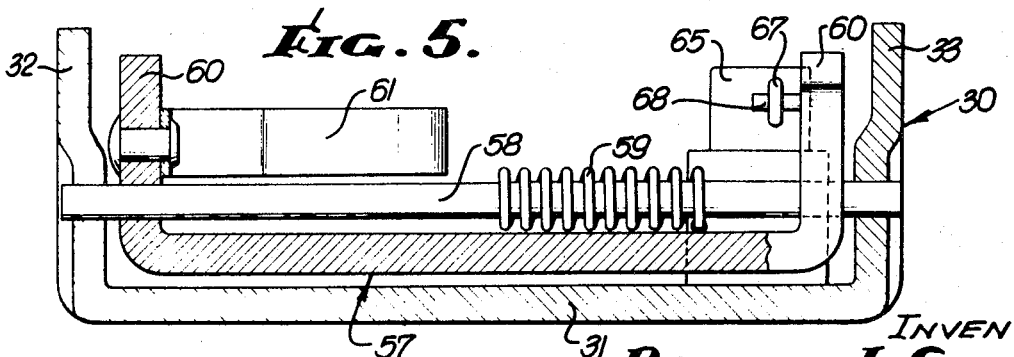
FIG. 5 is a sectional view of the retractor device taken along the plane V—V of FIG. 3.

Referring now to FIGS. 1 and 2, there is shown a first exemplary embodiment of a vehicle safety restraint apparatus indicated generally at 20. The safety restraint apparatus 20 is mounted in a conventional vehicle having an outer wall 21, including a ceiling and side wall, a door 22, windows 23, and a conventional bucket-type seat 24. The exemplary restraint apparatus 20 is illustrated in FIGS. 1 and 2 for use by the driver occupant of the vehicle. It will be obvious to those having ordinary skill in the art that the restraint apparatus can be mounted for use by an occupant in the other front seat of the vehicle, or in the rear seat or seats.

The first exemplary embodiment of the safety restraint apparatus 20 comprises a chest or shoulder strap 25 having connecting means 26 secured to the free end thereof, retracting means indicated generally at 27, stowing means 28, and complementary floor-mounted latching means 29.

Latching means 26 and 29 in the first embodiment of the safety restraint apparatus 20 will be understood to be only exemplary, as will be made more clear from the subsequent description of a second embodiment of a safety restraint apparatus which employs a different type of latching means. In the embodiment illustrated in FIGS. 1 and 2, the latching means 26 secured to the end of the shoulder strap 25 may be of the type illustrated in U.S. Pat. No. 3,378,301, issued Apr. 16, 1968. Briefly, such latching means comprises a connector having a hook portion and a pivotal latch arm which releasably engages an anchorage or complementary floor-mounted latching means 29. Latching means 29, rather than an anchorage, may comprise a short strap section as in the aforementioned patent and may include a lap belt also connected thereto as disclosed in such patent. Alternatively, the safety restraint apparatus may include a conventional lap belt 29' which is mounted to the vehicle floor on opposite sides of the occupant and includes latch means for connecting two lap straps to form the lap belt 29'. Under no circumstances should the shoulder strap 25 be used alone, as is well known to those skilled in the art.

The other end of the shoulder strap 25 is connected to the retracting means 27 which is mounted to the vehicle outer wall 21 at a location which is above and rearwardly of the shoulder of the occupant to be restrained. Thus, when the shoulder strap is connected through latching means 26 to anchorage 29, the shoulder strap 25 is positioned diagonally across the chest of the occupant so as to restrain the upper body against forward movement in the event of sudden deceleration of the vehicle.

The first exemplary embodiment of a safety restraint apparatus 20 also includes retracting means including a reel rotatably mounted in a frame secured to the vehicle outer wall and on which the shoulder strap is wound while the reel is biased for constant retraction of the shoulder strap about the reel. A suitable retracting means for use in the present invention is described and illustrated in U.S. Pat. No. 3,174,704 issued Mar. 23, 1965. In such retractor device, as explained above, there is a constant retraction bias for the strap connected to the device. Retracting means for the present invention may also be of the linear type disclosed in the aforementioned patent which employs securing means for the safety strap that includes a pawl member in operative relation to a linear ratchet member. The strap secured to such retractor devices may be stowed in an out-of-the-way position by the provision of stowing means mounted to the outer wall at a spaced apart location from the retractor device. In this configuration, the strap is stowed in an out-of-the-way position by engaging the latching means 26 on the end of the shoulder strap 25 to the stowing means 28. When the shoulder strap is to be used, the occupant reaches up and grasps the latching means 26 so as to disengage it from the stowing clip and protracting the strap from the retracting means until the latching means 26 may be secured onto the anchorage 29. To stow the shoulder strap, the operation is simply reversed.

It will therefore be seen that through the provision of a spring biased retracting means to which a shoulder strap is attached and which is mounted to a vehicle outer wall at a location which is above and rearward of the occupant's shoulder and through the provision of a spaced apart stowing means also mounted on the vehicle outer wall for engaging latching means secured on the end of a shoulder strap, several of the above-mentioned objects of the present invention are attained. Specifically, although the shoulder strap is of considerable length, the entire strap is not wound on the retracting means since a portion of the strap is in a protracted condition when the connecting means is secured to the stowing clip. Consequently, the spring used in the retracting means need not be of a strength as would be required if the entire strap was wound on the reel. Furthermore, the protracted portion of the strap when in the stowed condition, i.e., the strap is not being used, is proximate the vehicle outer wall so as not in inhibit the ingress and egress of the occupant into and out of the vehicle.

The present invention also provides retracting means of the above-described type which additionally includes means for preventing further retraction of a strap after the strap is protracted and then allowed to partially retract. Such retracting means is particularly advantageous for use in the above-described first exemplary embodiment of a safety restraint apparatus 20. Reference will now be made to FIGS. 3 through 8 for a complete description of retracting means 27 for use in the safety restraint apparatus 20.

Retracting means 27 comprises a frame 30 including a base 31 and a pair of upturned opposed side walls 32, 33. As best seen in FIG. 7, side walls 32, 33 are provided with bores 34, 35 respectively. Bores 34, 35 receive a reel which includes the arbor 36. Arbor 36 projects outboardly of side wall 33 and has an off-center slot 37 in the end thereof. A coil spring 38 is disposed within a cap housing 39 secured to the side wall 33, one end of the coil spring received in slot 37 of arbor 36, and the spring being prewound within housing 39 to provide a constant rotational bias to arbor 36. A cylinder 40 with a through-slot 41 and castellated ends 42 is concentrically disposed around arbor 36. Ratchet wheels 43 are provided with circumferentially spaced arcuate slots 44 and central bores 45 press fit on the castellated ends 42 of cylinder 40 so as to fix cylinder 40 in radially spaced relation to arbor 36. One end of arbor 36 is provided with a flat portion 47 matingly engaging a flat portion 48 in one of the ratchet wheels 43 so that the ratchet wheels and cylinder 40 are non-rotationally mounted on arbor 36. Each of the ratchet wheels 43 is provided with circumferentially spaced arcuately sloped peripheral sectors, such as at 49 (see FIG. 3), so as to define circumferentially spaced notches 50.

A circular spacer ring 51 is mounted on one end of the arbor 36 between one of the ratchet wheels 43 and side wall 33 of the frame 30. Disposed between the other ratchet wheel 43 and the side wall 32 is a circular spring 52 and a locking disc 53 having an outwardly directed tab 54 received within an arcuate slot 55 of side wall 32 to limit angular movement of disc 53 and a radially outwardly extending pawl engaging element 56.

Longitudinally spaced from the arbor 36 is a locking element 57 mounted on a shaft 58 which carries a torsion spring 59; the locking element including pawls 60 for engaging the notches 50 in ratchet wheels 43.

The retracting means 27 is also provided with deactivator means responsive to a predetermined amount of the strap wound around the reel for rendering inactive the means for preventing further protraction and retraction of the strap. Such deactivator means is operative to deactivate the means for preventing retraction and protraction of the strap when the strap is wound about the reel to a predetermined radius. Upon protraction of the strap (decreasing the wound radius), the deactivator means is rendered inoperative, but will be operative again when the strap is rewound. In the exemplary embodiment, such deactivator means comprises the sensor element 61 which is riveted to one of the pawls 60 on locking element 57 and extends inwardly toward the reel.

In use, the shoulder strap 25 is secured to the arbor 36 and is wound around the cylinder 40 comprising the center portion of the reel. The strap is therefore in a prewound condition and is constantly biased by the coil spring 38 for retraction. In this fully wound condition, it will be seen that the radius of the wound strap causes the strap to bear upon the sensor element 61 so as to rotate the locking element 57 counterclockwise, as viewed in FIG. 3, so that the pawl 60 is deactivated, i.e., will not engage the notches 50 in ratchet wheel 43. With the pawl in this disengaged position, protraction of the shoulder strap 25 causes rotation of locking disc 53 through frictional contact between the locking disc and the outer surface of the adjoining ratchet wheel 43 due to the bias of spring 52. Tab 54 on locking disc 53 limits the angular or arcuate movement of locking disc 53 so that the locking element 56 on the locking disc is positioned forward and between the pawl 60 and its cooperating ratchet wheel 43. As protraction of the shoulder strap continues, the radius of the wound shoulder strap decreases so that eventually sensor element 61 is not in contact with the strap and is rendered inoperative. The pawls will not be held in disengagement by the sensor element, therefore, and are thus activated. However, as the radius of the strap decreases allowing the sensor element and the pawls to rotate clockwise, as viewed in FIG. 3, under the force of torsion spring 59, the locking element 56 on the locking disc will be disposed between the pawls and their associated ratchet wheels 43, as seen in FIG. 8. Thus, the pawls will remain out of engagement and protraction may continue although the sensor element is inoperative.

When the desired length of shoulder strap has been protracted, the strap is allowed to partially retract, causing the reel and the locking disc 53 to rotate clockwise so as to remove the locking element 56 from between the pawls and their associated ratchet wheels. The pawls 60 will immediately be active and engage the notches 50 in the ratchet wheels 43 so as to lock the reel against further protraction and retraction.

It will be noted that the notches 50 and the peripheral sectors 49 of the ratchet wheels 43 are formed so that there is considerable abutting engagement between the notch wall and the pawl when the reel is attempted to be rotated in a counterclockwise direction. Thus, high loads on the safety straps during restraint of an occupant upon deceleration of the vehicle which causes protraction of the shoulder strap can be withstood by the ratchet wheels without structural failure. On the other hand, only the spring force of coil spring 38 need be resisted to prevent retraction of the shoulder strap about the reel and thus the other notch wall need only be in slight engaging contact with the pawl 60.

From the foregoing description, it will also be seen that the retracting means 27 allows the shoulder strap to be used in a completely tensionless condition since the spring biased reel is prevented against retraction and all tension from the shoulder strap is relieved.

When the retracting means 27 is used in the first exemplary embodiment of a safety restraint apparatus 20, as above described, there is provided means for selectively overriding the protraction and retraction preventing means of the retracting means 27. Such override means may include stowing means for engaging the latching means of the shoulder strap to maintain the latching means in an out-of-the-way position. In the exemplary embodiment of FIGS. 1 through 6, the override means may comprise an electrical solenoid 65 mounted on base 31 of frame 30 of retracting means 27. Solenoid 65 has electrical leads 66 and an actuating rod 67. Actuating rod 67 is pivotally mounted to a pin 68 mounted on one of the pawls 60 at a spaced apart location from pivot shaft 58 of the pawl.

The stowing means of the first exemplary embodiment of FIGS. 1 and 2, which is used to support the shoulder strap latching means in an out-of-the-way position, comprises the stowing clip 28 illustrated in detail in FIGS. 9 through 11.

Stowing clip 28 generally comprises base 70, a pair of mounting ears 71, 72 and an opening 73. A hook-shaped support arm 74 is pivotally mounted on a shaft 75 secured in mounting ears 71, 72. Support arm 74 is biased in a counterclockwise direction, as viewed in FIG. 9, by torsion spring 76 mounted on shaft 75. An electrical switch 77 is mounted on base 70 and includes a reciprocable contact button 78 in operative engagement with the lower end of support arm 74. Electrical leads 79 of electric switch 77 are connected to the leads 66 of solenoid 65. The stowing clip is mounted to the outer wall 21 of the vehicle, as seen in FIG. 2, so that the hook-shaped support arm 74 extends forwardly.

In operation, assume that the latching means 26 is supported by stowing clip 28 as seen in FIG. 1. When the occupant desires to use the shoulder strap 25, he reaches up and grasps the latching means 26 disengaging it from the stowing clip and drawing the shoulder strap downwardly so as to be disposed across his chest. The strap is protracted to a sufficient length so that the latching means 26 may be engaged with the anchor 29. The occupant then allows the strap 25 to retract slightly, thereby engaging the means for preventing further protraction and retraction of the shoulder strap. The shoulder strap is thereby positioned in a tensionless condition across the chest of the occupant to provide effective restraint.

To stow the shoulder strap 25, the unlatching means 26 is released from the anchor 29 and engaged with the support arm 74 of stowing clip 28. Since the means for preventing retraction and protraction of the strap of retracting means 27 is effective, the strap 25 will hang in a loose arc between the retracting means 27 and the stowing clip 28. The occupant then forces the latching means 26 to pivot the hook-shaped support arm 74 so as to depress contact button 78 making an electrical switch at 77 so as to activate solenoid 65 which withdraws arm 67 and thereby pawls 60 from engagement with ratchet wheels 43 allowing the reel to rotate freely. The bias of the coil spring 38 therefore effects immediate retraction of the shoulder strap 25 until the strap is taut or in tension between the retracting means 27 and the stowing clip 28. In this condition, the shoulder strap is proximate the vehicle outer wall 21 and completely in an out-of-the-way position, as seen in FIG. 1, allowing free ingress and egress of occupant into the vehicle.

If the occupant wishes to adjust the length of the strap after it is put into use at a particular length, it is only necessary to move the support arm of the stowing means which overrides the means for preventing protraction and retraction of the strap.

A second embodiment of a safety restraint apparatus 120 is illustrated in FIGS. 12 through 15. The safety restraint apparatus 120 is mounted in a vehicle having an outer wall 121, including a ceiling and side wall, a door 122, windows 123, and a conventional seat 124.

The second exemplary embodiment of the safety restraint apparatus 120 comprises a chest or shoulder strap 125 having connecting means 126 secured to the free end thereof, retracting means indicated generally at 127, stowing means 128, and complementary floor-mounted latching means 129. In the present embodiment, floor-mounted latching means 129 includes a pair of seat belt portions 129a and 129b with suitable connecting members. One of the seat belts connecting members is provided with means for receiving and securing complementary latching means 126 having an opening for engaging stowing means 128.

In the second exemplary embodiment of the safety restraint apparatus, retracting means 127 is mounted forwardly of the occupant to be restrained and above the door 123. In this location, the retracting means may be entirely concealed since the space between the headliner and the outer wall of the vehicle is large enough in most vehicles for receiving the retracting means without any bulge or discontinuity in the headliner. However, the secured end of the shoulder strap 125 is effectively mounted rearwardly and above the shoulder of the occupant to be restrained through a roller means 130 mounted on vehicle outer wall 121. As seen best in FIG. 13, roller means 130 comprises a frame 131 secured to the vehicle outer wall and a roller 132 rotatably supported in the frame. The shoulder strap 125 extends from the reel of the retracting means 127 rearwardly beneath the headliner of the vehicle and around the roller 132. The term "effectively mounted" is used herein to refer to an apparatus in which the retracting means is either actually or through additional means mounted in spaced relation to the actual retracting means, positioned at a particular location on the vehicle outer wall.

The retracting means 127 of the second exemplary embodiment of the safety restraint apparatus 120 is substantially identical to the retracting means 27 of the first exemplary embodiment. The retracting means 127 includes a frame 130 having a base 131 and side walls, one of which is shown at 132. A reel is rotatably mounted in the frame 130 and includes a ratchet wheel 133 and a locking element 134 including a pawl 135 and pivotally mounted on a shaft 136.

The second exemplary embodiment 120 also comprises override means for deactivating the means for preventing further protraction and retraction of the shoulder strap by the retracting means. The override means of the present embodiment is best seen and understood by reference to FIGS. 14 and 15. The override means of the second embodiment may include a support arm 140 mounted on side wall 132 of frame 130 through a pivot pin 141 including a hook-shaped arm 142 extending over and above the reel, and a trip arm 143. Pawl 135 is provided with a trip pin 144 that extends through a slot 145 in side wall 132 of the frame 130.

As seen best in FIGS. 12 and 13, the retracting means 127 is mounted in inverted position to outer vehicle wall 121 and above the door 123 of the vehicle. The hook-shaped arm of the override means extends through a suitable opening in the vehicle headliner and projects downwardly and forwardly.

In use and operation, the second exemplary embodiment of a safety restraint apparatus 120 is similar to that of the first embodiment 20. To stow the shoulder strap 125, the connecting means 126 on the end of the shoulder strap is engaged with the hook-shaped arm of the override means and rearward movement of the arm 128 causes the trip arm 143 to actuate the trip pin 144 so as to move pawl 135 out of engagement with ratchet wheel 133 thereby allowing the shoulder strap to be retracted until the strap is in tension between the roller means 130 and the stowing clip 128.

From the above description, it will be apparent that various types of latching means may be used in conjunction with the present invention. While the stowing clip illustrated in the two described embodiments comprises a hook-shaped element for engaging an opening in the latching means of the shoulder strap, it will be apparent that other types of stowing clips may be used. For example, where the latching means on the end of the shoulder strap does not have an opening, or where such opening cannot be provided, but includes some projection, the stowing clip may be provided with an opening for engaging the projection on the latching means. It will also be seen that the restraint apparatus of the present invention includes a shoulder strap which may be used by itself, such as illustrated with respect to the first embodiment, or in conjunction with lap or seat belts such as illustrated with the second embodiment. Other configurations employing the present invention will be obvious to those having ordinary skill in the art.

Other modifications and variations of the present invention are possible in light of the above teaching. It is therefore to be understood that within the scope of the appended claims, the invention may be practiced otherwise than as specifically described.

I claim:

1. A safety restraint apparatus for use in a vehicle having an outer wall and floor-mounted latching means, comprising:

a shoulder strap including complementary latching means on one end thereof for engaging the floor-mounted latching means so as to position the strap across the chest of a vehicle occupant, the other end of the shoulder strap connected to retracting means;

said retracting means effectively mounted on said vehicle outer wall rearwardly and above the shoulder of the occupant to be restrained and including, a frame, means carried by said frame to which said shoulder strap is secured for protraction and retraction, spring means constantly biasing said strap for retraction thereof, and means for automatically preventing further protraction and retraction of said shoulder strap after said strap is protracted and then allowed to partially retract;

means for selectively overriding said protraction and said retraction automatic preventing means comprising a trip pin mounted on said means for automatically preventing further protraction and retraction of said shoulder strap and a trip arm pivotally mounted on said frame; and stowing means for supporting said shoulder strap latching means in an out-of-the-way position proximate the vehicle outer wall when the shoulder strap is not in use comprising a support arm connected to said trip arm, whereby said shoulder strap latching means may be engaged with said support arm so as to actuate said trip arm to move said trip pin so as to deactivate said means for automatically preventing further protraction and retraction of said strap whereby said strap will be retracted to the out-of-the-way position.

2. The safety restraint apparatus of claim 1 wherein said retracting means is mounted forwardly and above the shoulder of the occupant to be restrained, and includes means for effectively mounting the retracting means rearwardly and above the shoulder of the occupant comprising roller means rotatably mounted to the vehicle outer wall rearwardly and above the shoulder of the occupant so that said shoulder strap passes from said securing means rearwardly through said roller means and then forwardly and downwardly when in use, and forwardly and proximate the vehicle outer wall when not in use.

* * * * *